(12) United States Patent
Meyer et al.

(10) Patent No.: US 7,455,808 B2
(45) Date of Patent: Nov. 25, 2008

(54) MANUFACTURE OF PLASTIC CONTAINERS HAVING INTERNAL IDENTIFYING INDICIA MOLDED ON A CONTAINER WALL

(75) Inventors: Todd W. Meyer, Ottawa, OH (US); Donald P. Delagrange, Toledo, OH (US)

(73) Assignee: Rexam Healthcare Packaging Inc., Perrysburg, OH (US)

( * ) Notice: Subject to any disclaimer, the term of this patent is extended or adjusted under 35 U.S.C. 154(b) by 208 days.

(21) Appl. No.: 11/129,524

(22) Filed: May 13, 2005

(65) Prior Publication Data

US 2006/0255235 A1 Nov. 16, 2006

(51) Int. Cl.
B29C 33/42 (2006.01)
B29C 49/06 (2006.01)

(52) U.S. Cl. .................. 264/537; 264/318; 264/319; 264/328.1

(58) Field of Classification Search .......... 264/318, 264/319, 328.1, 537; 249/104; 425/533
See application file for complete search history.

(56) References Cited

U.S. PATENT DOCUMENTS

| | | | |
|---|---|---|---|
| 2,601,700 A | 7/1952 | Pinsky et al. | |
| 3,550,197 A | 12/1970 | Szanjna et al. | |
| 4,024,975 A | 5/1977 | Uhlig | |
| 4,286,940 A | 9/1981 | Gendron | |
| 4,287,150 A | 9/1981 | Gendron | |
| 4,395,378 A | 7/1983 | Alberghini et al. | |
| 4,588,465 A | 5/1986 | Paciorek | |
| 4,603,831 A * | 8/1986 | Krishnakumar et al. | 249/144 |
| 4,959,006 A * | 9/1990 | Feddersen et al. | 425/533 |
| 5,124,110 A * | 6/1992 | Yokobayashi | 264/520 |
| 5,229,142 A * | 7/1993 | Yokobayashi | 425/522 |
| 5,756,038 A * | 5/1998 | Iseli et al. | 264/506 |
| 6,068,811 A * | 5/2000 | Koda | 264/537 |
| 6,740,283 B2 | 5/2004 | Matsui et al. | |
| 2006/0070975 A1 * | 4/2006 | Shih | 215/379 |

FOREIGN PATENT DOCUMENTS

| | | |
|---|---|---|
| EP | 1598167 A1 | 11/2005 |
| GB | 1600523 | 10/1981 |
| JP | 05957724 | 3/1984 |
| JP | 05169521 | 7/1993 |

OTHER PUBLICATIONS

U.S. Appl. No. 10/789,8745, filed Feb. 27, 2004 Title: Container Having Fluorescent Indicia.
U.S. Appl. No. 10/793,523, filed Mar. 3, 2004 Title: Container Having Irradiated Indicia.

* cited by examiner

*Primary Examiner*—Suzanne E. McDowell
(74) *Attorney, Agent, or Firm*—Reising, Ethington, Barnes, Kisselle, P.C.

(57) ABSTRACT

A method of making a container preform includes providing a mold core having at least one surface recess in the form of negative-mold indicia, and molding a preform around the core such that the preform has internal raised indicia formed by the at least one recess in the core. The preform preferably subsequently is blow-molded to form a container having the raised indicia on an inside surface of the container. This raised indicia on the inside surface of the container may be viewed from outside of the container to confirm that the container is genuine. In accordance with various embodiments of the disclosure, the raised internal indicia may be on the bottom wall, sidewall, shoulder and/or neck of the container.

1 Claim, 3 Drawing Sheets

MANUFACTURE OF PLASTIC CONTAINERS HAVING INTERNAL IDENTIFYING INDICIA MOLDED ON A CONTAINER WALL

The present disclosure relates to manufacture of blow-molded plastic containers and preforms for such containers, and more particularly to manufacture of containers and preforms having an I.D. or logo in the form of internal raised indicia on a wall of the container or preform.

BACKGROUND AND SUMMARY OF THE DISCLOSURE

Plastic containers may be blow-molded from preforms that are injection or compression molded around a core rod. Processes for injection molding the container preforms and then blow molding the containers are illustrated, for example in U.S. Pat. Nos. 3,707,591 and 5,098,274. A process for compression molding the container preforms and then blow molding the containers is illustrated for example in U.S. Pat. No. 6,716,386. The preforms and containers may be of monolayer construction, or may be of multilayer construction having one or more intermediate barrier layers, for example, extending at least partially through a wall of the preform or container. Blow-molded plastic containers may be used in many applications, including medical and pharmaceutical applications in which there is a danger that the package may be counterfeited. A general object of the present disclosure is to provide raised indicia on the inside surface of the container that may be viewed by a pharmacist, for example, from outside of the container to confirm that the container and package are genuine.

The present disclosure embodies a number of aspects or inventions that can be implemented separately from or in combination with each other.

A method of making a container preform, in accordance with one aspect of the present disclosure, includes providing a core having at least one surface recess in the form of negative-mold indicia, and molding a preform around the core such that the preform has internal raised indicia formed by the at least one recess in the core. The preform preferably subsequently is blow-molded to form a container having the raised indicia on an inside surface of the container. This raised indicia on the inside surface of the container may be viewed from outside of the container to confirm that the container is genuine. In accordance with various embodiments of the disclosure, the internal raised indicia may be on the bottom wall, sidewall, shoulder and/or neck of the container.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figure 1:
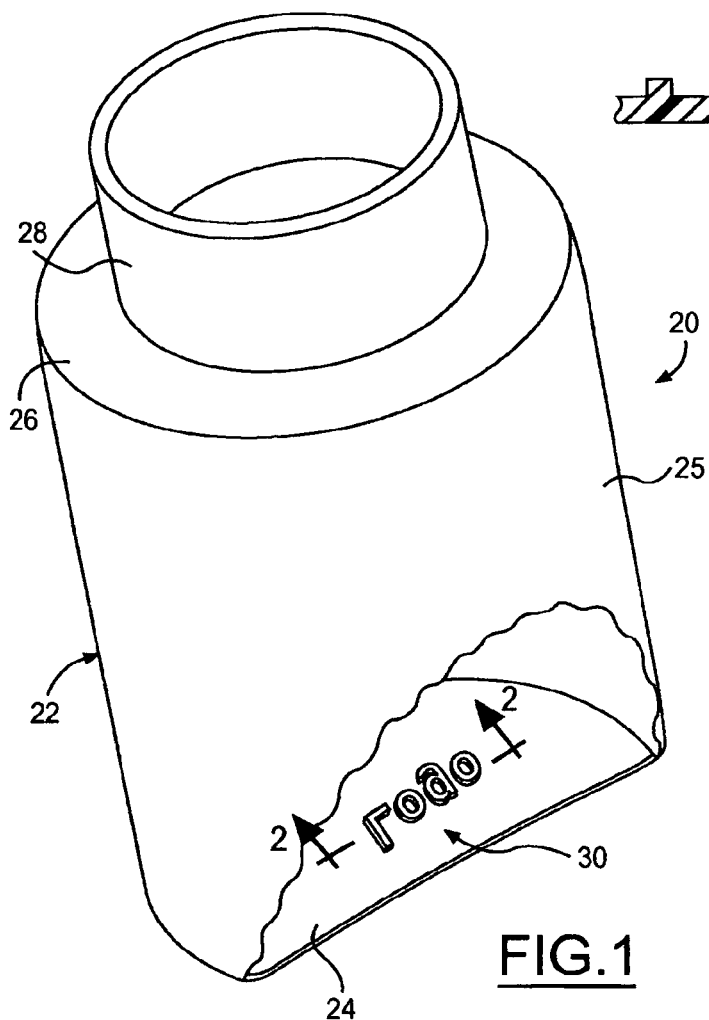
FIG. 1 is a fragmentary perspective view of a container in accordance with one embodiment of the present disclosure.
Figure 2:
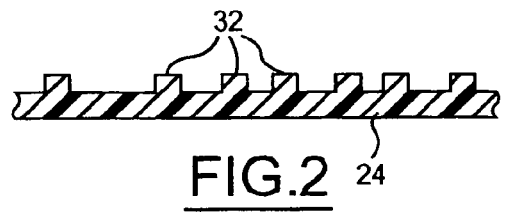
FIG. 2 is a fragmentary sectional view taken substantially along the line 2-2 in FIG. 1.

FIGS. 1-2 illustrate a container 20 in accordance with one embodiment of the present disclosure. Container 20 has a body 22 with a bottom wall or push-up 24, a sidewall 25, a shoulder 26 and a neck finish 28 extending from the shoulder. At least sidewall 25, bottom wall 24 and shoulder 26 are of blow-molded construction of any suitable monolayer or multilayer plastic composition. An I.D. or logo 30 is provided on container bottom wall 24. Logo 30 is in the form of internal raised indicia 32 (FIG. 2)—i.e., rib-like indicia raised from the inside surface of wall 24. Indicia 30 may comprise a word and/or symbol that identifies container 20, ranging from a simple logo as illustrated in FIG. 1 to more complex information such as product or lot number information associated with the product within the container for example. The indicia may be read or viewed from outside of the container by persons who know where to look for the indicia to confirm the genuineness of the container.

Figure 3:
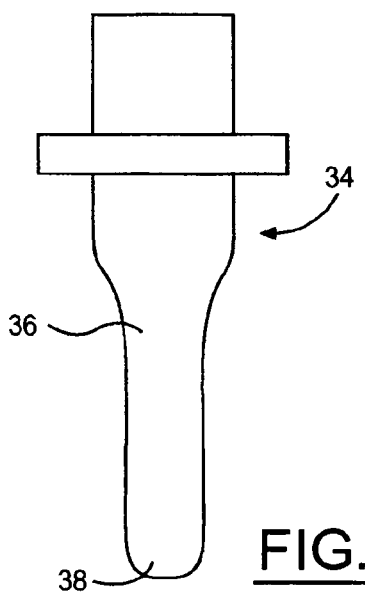
FIG. 3 is an elevational view of a core for injection molding a container preform in accordance with another aspect of the present disclosure.
Figure 4:
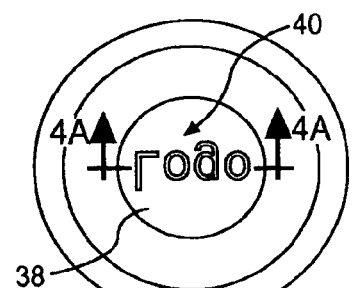
FIG. 4 is an end elevational view of the mold core in FIG. 3.
Figure 4A:
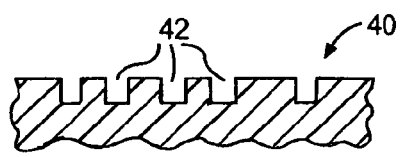
FIG. 4A is a sectional view taken substantially along the line 4A-4A in FIG. 4.
Figure 5:
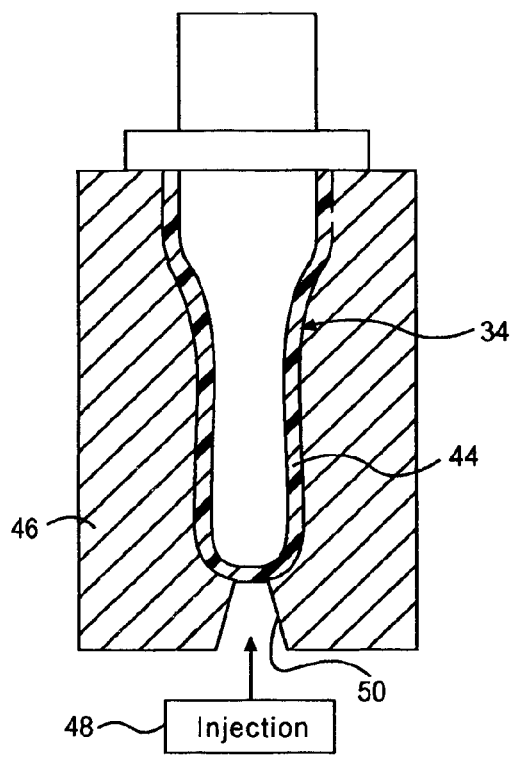
FIG. 5 is a schematic illustration of a process for injection molding a preform around the core of FIG. 3.

FIGS. 3-4A illustrate a mold core 34 for forming a preform for blow molding container 20. Mold core 34 includes a core body 36 having a core tip 38. Negative mold indicia 40 (FIGS. 4 and 4A) are formed in tip 38 by a suitable etching or machining operation, for example, to provide the indicia in the form of a series of negative-mold recesses or channels 42. The number and geometry of such channels will, of course, be dictated by the desired raised indicia 30 (FIG. 1) within the container. FIG. 5 illustrates use of mold core 34 for injection molding a container preform 44. Core 34 is placed in a suitable injection mold 46, and one or more plastic materials are injected by suitable machinery 48 through a gate 50 in mold 46. (Gate 50 need not be opposite the tip of core 34.) The core is then moved to a suitable blow mold 52 (FIG. 6), at which air or other suitable gas is fed through the core to blow mold container 20 to the internal confines of the cavity in mold 52. In the blow-molded container, the negative-molded indicia in the preform forms internal raised indicia 30 on container bottom wall 24.

Figure 6:
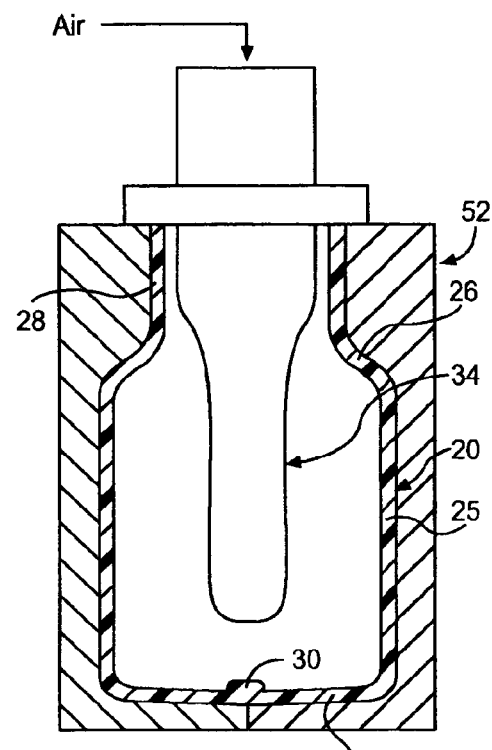
FIG. 6 is a schematic illustration of a process for blow molding a container from the preform molded in FIG. 5.

FIGS. 5 and 6 illustrate implementation of the disclosure in an injection blow molding operation. The disclosure also may be implemented in a reheat blow molding operation, in which the preform is injection or compression molded around the mold core, and the preform is removed from the core for storage or further processing.

Figure 7:
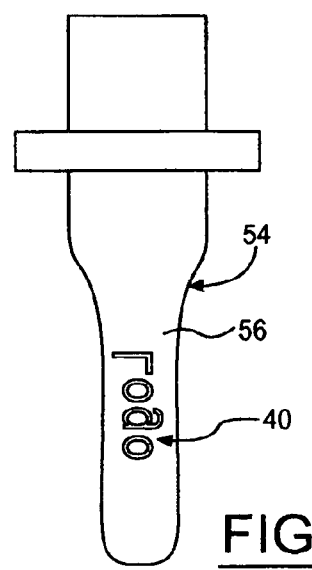
FIG. 7 is an elevational view of a mold core in accordance with a modified embodiment of the disclosure.
Figure 8A:
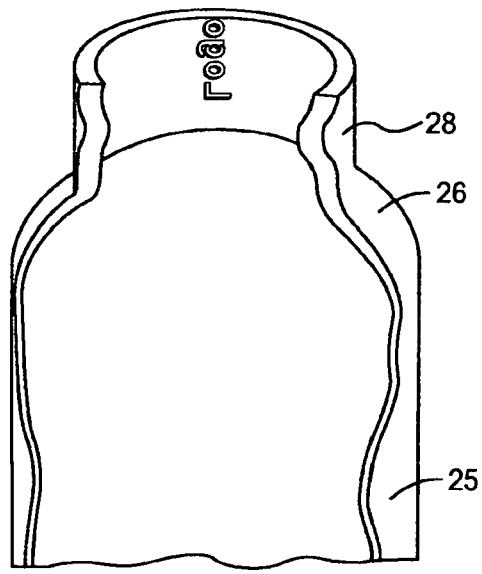
FIGS. 8A, 8B and 8C are schematic diagrams of blow-molded plastic containers in accordance with modified embodiments of the disclosure.
Figure 8B:
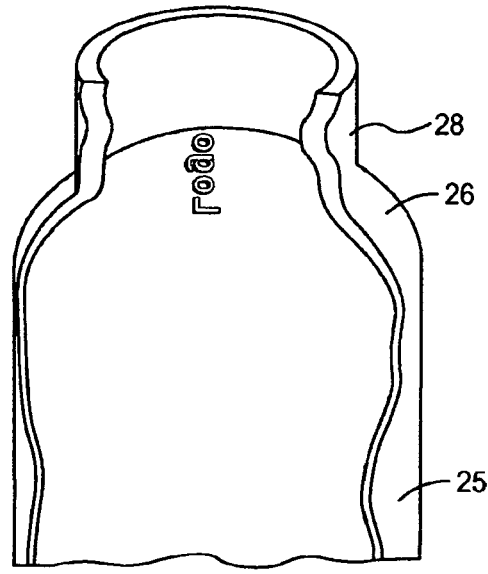
Figure 8C:
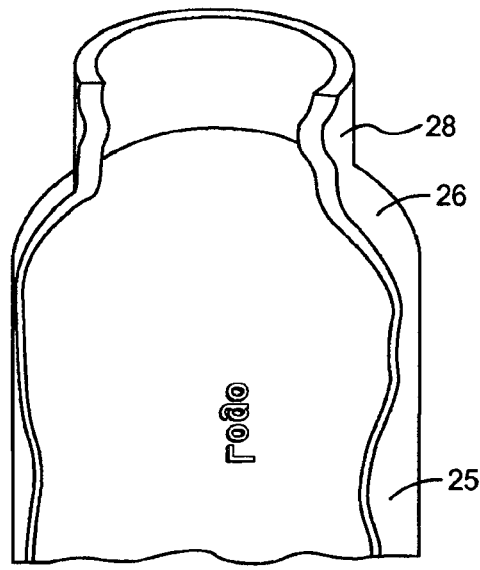

FIG. 7 illustrates a mold core 54 in which the negative mold indicia 40 is formed on a side surface 56 of the core rather than on the core tip. Indeed, in accordance with the present disclosure in its broadest aspects, the negative mold indicia on the preform and the raised internal indicia on the blow-molded container may be positioned so that the raised internal indicia on the container is in the container neck finish 28 as shown in FIG. 8A, the container shoulder 26 as shown in FIG. 8B or the container sidewall 25 as shown in FIG. 8C.

There thus have been disclosed a method of making a container preform, a method of making a blow-molded plastic container, a container preform, a blow-molded plastic container, and a mold core for molding a container preform that fully satisfy all of the objects and aims previously set forth. The disclosure has been presented in conjunction with a number of illustrative embodiments, and various modifications and variations have been discussed. Other modifications and variations readily will suggest themselves to persons of ordinary skill in the art in view of the foregoing discussion.

The disclosure is intended to embrace all such modifications and variations as fall within the spirit and broad scope of the appended claims.

The invention claimed is:

1. A method of making a container having internal molded indicia, which includes the steps of:
  (a) providing a mold core having at least one surface recess in the form of negative-mold indicia at a tip of said mold core,
  (b) placing said mold core in a mold cavity,
  (c) injection or compression molding a preform around the mold core in said cavity such that said preform has internal raised indicia formed by said at least one surface recess of said mold core within a closed end of said preform molded around said tip; and
  (d) blow molding said preform to form a container having said indicia in the form of raised indicia, which is raised from an inside surface of a bottom wall of said container.

* * * * *